United States Patent Office 2,870,112
Patented Jan. 20, 1959

2,870,112

CROSS-LINKED POLYESTERS OF DICYCLOPENTADIENE DICARBOXYLIC ACIDS

Joseph Kern Mertzweiller, Baton Rouge, La., assignor to Esso Research and Engineering Company, a corporation of Delaware No Drawing. Application March 1, 1956
Serial No. 568,940

12 Claims. (Cl. 260—33.6)

This invention relates to synthetic resins and particularly to such resins derived from dicyclopentadiene dicarboxylic acid compounds. The present invention further relates to new and useful modified polyester resins obtained by reacting dicyclopentadiene dicarboxylic acids, alkyl derivatives of said acids or partially hydrogenated derivatives of said acids with dihydric alcohols, diamines or amino alcohols and cross-linking the product formed with a minor proportion of an organic diisocyanate or diisothiocyanate.

In an embodiment of the invention, about 1 to 2 parts by weight of a dicyclopentadiene dicarboxylic acid are mixed with about 0.1 to 5.0 parts by weight of a $C_2$-$C_{10}$ glycol, for example, about 0.75 to 1.2 moles of the acid per mole of gycol, and the resulting mixture is blended with about 5 to 30 weight percent based on total composition of an organic diisocyanate. The blend formed is then heated at a temperature between about 250° to 500° F., advantageously 265° to 450° F., preferably 280° to 400° F. for about 0.5 to 20 hours or more whereby to produce a hard, improved, new and useful modified resinous polyester. In a preferred embodiment of the invention, the acid is condensed with the glycol at temperatures between about 325° to 400° F. and the product formed is cross-linked at temperatures between about 265° to 325° F. with the organic diisocyanate thereby substantially precluding reaction products of the monomer with the diisocyanate.

Dicyclopentadiene dicarboxylic acid and other dialkyl homologues of this acid may be prepared from cyclopentadiene. Commercially, cyclopentadiene, which is a valuable polymerization monomer, can be separated from a commercial petroleum fraction of $C_5$ olefins and diolefins by heating the mixture under such conditions of heat and pressure as to convert substantially all of the cyclopentadiene to polymeric form, chiefly dicyclopentadiene, without appreciably affecting the other unsaturated constituents thereof. Distillation of the lower boiling components of this partially polymerized mixture then gives a residue consisting largely of dicyclopentadiene and minor amounts of the dimers and codimers of other unsaturates in the original mixture together with minor amounts of higher polymers and copolymers of both cyclopentadiene and other unsaturates. Continued heating of this dicyclopentadiene concentrate at reflux, which temperature of course will be approximately the boiling point of dicyclopentadiene, results in depolymerization of substantially all of the dicyclopentadiene and distillation of the cyclopentadiene formed without appreciably effecting depolymerization of other dimers and codimers in the mixture.

Starting with cyclopentadiene or alkyl (especially dialkyl) homologues of cyclopentadiene, the corresponding dicarboxylic acids may be prepared by reacting therewith finely divided metallic sodium, preferably having an average particle size of less than 50 microns in diameter, to form the respective sodium cyclopentadienes. Reaction is accelerated by employing a small amount of anhydrous alcohol activator. The sodium cyclopentadienes are then converted to the corresponding dicarboxylic acids by treatment with carbon dioxide, preferably at superatmospheric pressures; e. g., up to 1000 p. s. i. g.

As abovementioned, the sodium employed in this reaction is in the form of a finely divided dispersion wherein the particles have an average size of less than 50 microns in diameter. Dispersion is obtained, for example, by mechanical means either with or without the aid of emulsifying or dispersing agents. The alcohol activator is substantially anhydrous alcohol, such as the low molecular weight aliphatic alcohols such as methanol, ethanol, isopropanol, etc. Alcohols containing up to four carbon atoms per molecule are suitable but methanol, ethanol or isopropanol are preferred. The alcohol is employed in relatively small amounts, that is, less than 1 molecule based on the sodium and usually in amounts less than 1/10 mol equivalent. The alcohol serves to activate the sodium either by removing surface impurities contained thereon or by forming small quantities of sodium alcoholate. Gassing with carbon dioxide is carried out at pressures above atmospheric, up to 1000 p. s. i. g., for best yields. Good reaction is obtained at 50 to 1000 lbs. but since the tank pressure of $CO_2$ as handled commercially is usually about 900 to 1000 p. s. i. g. this latter pressure is preferred.

While frequent reference is made in the literature to the use of metallic potassium for reacting with the methylene group of cyclopentadiene so as to form cyclopentadienyl potassium, no references have been found where the corresponding sodium salt was made by direct reaction of sodium with cyclopentadiene. If sodium is previously dispersed to a very finely divided state, preferably having a particle size of less than 50 microns in diameter, e. g., by mixing with xylene, heating to above the melting point of the sodium and then passing the mixture through a high-speed colloid mill and continuing the operation until the temperature falls below the solidification point of the sodium, one obtains the sodium in a highly reactive state. With sodium in such a finely divided state some reaction may be obtained with cyclopentadiene, but the reaction tends to be relatively slow. If to a mole of dispersed sodium there is added 1 to 2 grams of anhydrous ethyl or isopropyl alcohol so as to activate the sodium either by removing, by means of solution, surface impurities or by forming small quantities of sodium alcoholate, immediate reaction may be obtained when a mole of monomeric cyclopentadiene is added to the dispersed sodium. Under these conditions the cyclopentadienyl sodium is readily formed, and when this sodium salt is then transferred to a suitable pressure-resistant vessel and treated at superatmospheric pressure with carbon dioxide one obtains almost exclusively the disodium salt of the dicyclopentadiene dicarboxylic acid having a minimum of sodium carbonate or bircarbonate present. In distinction to the use of carbon dioxide under pressure, if one gasses the mixture of the sodium or potassium cyclopentadiene with carbon dioxide at atmospheric pressure a large proportion of the mixture ends up as sodium carbonate or bicarbonate, giving ultimately poor yields of the desired dicarboxylic acid.

The materials to be condensed with the foregoing acids and subsequently cross-linked according to the present invention may be dihydric alcohols, diamines or amino alcohols. Such materials include ethylene glycol; diethylene glycol; triethylene glycol; propylene glycol; 1,2 butanediol; 1,3 butanediol; 2,3 butanediol; trimethylene glycol; tetramethylene glycol; pentamethylene glycol; mono ethanolamine; amino butanol; amino octanol; diglycol phthalate; ethylene diamine, etc.

For the purposes of the present invention, the preferred organic diisocyanate or diisothiocyanate cross-linking agents are aliphatic diisothiocyanates or especially aliphatic diisocyanates. Suitable cross-linking agents include hexamethylene diisocyanate, hexamethylene diisothiocyanate, m- or p-phenylene diisothiocyanates or diisothionates, diphenyl methane diisothiocyanate or especially diphenyl methane diisocyanate.

The following runs and examples more fully explain the present invention but are not to be considered as limiting since they are given for the purposes of illustration only:

*Run #1.—Cyclopentadienyl sodium.*—Twenty-three grams of sodium is added to 500 ml. of xylene contained in a one-liter stainless steel beaker which is heated by means of a hot plate to a temperature of 120°–125° C. At this point a homogenizer-type of mixer, available commercially as a "Homomixer," is immersed into the mixture of molten sodium in xylene and the mixer run for a period of approximately 15 seconds. At the completion of the run, the mixer is rinsed with approximately 100 ml. of xylene so as to wash off occluded sodium, and the entire mixture of dispersed sodium in xylene transferred to a one-liter flask fitted with an efficient stirrer, thermometer, dropping funnel, and reflux condenser.

To the well-stirred mixture is then added 80 g. of freshly cracked and distilled monomeric cyclopentadiene boiling at 40°–41° C., representing a 20% excess of the diolefin over the sodium. Just prior to addition of the diolefin there is added to the flask one or two ml. of anhydrous ethanol or isopropanol. With addition of the diolefin an immediate rise in temperature is noted, and the temperature of the flask contents is maintained within the limits of 30°–35° C. by means of external cooling, using if necessary, a bath composed of solid carbon dioxide and alcohol. Addition time for the diolefin is usually in the neighborhood of one hour, and further stirring is continued for at least another hour at the same temperature in order to insure full reaction. The sodium changes from a dark gray powder to a voluminous precipitate having a white to a light gray appearance.

The cyclopentadienyl sodium may be reacted with alkyl halides, acid chlorides or esters of chloracetic acid to give respectively: dialkyl dicyclopentadiene, diketones of dicyclopentadiene, and bis (carboxymethyl esters) of dicyclopentadiene.

*Run #2.—Disodium dicyclopentadiene dicarboxylic acid.*—The flask contents from run #1 are then charged to a bomb capable of withstanding pressure in excess of 1000 lbs. The bomb should be of a suitable resistant material such as stainless steel, nickel, Iconel, Monel or may be a silver-lined bomb. The bomb is fastened into a shaking machine and charged with full tank pressure of carbon dioxide which will normally be within the limits of 900–1000 lbs. per sq. in. gage. When charging with carbon dioxide an immediate rise in temperature is noted and a fall in pressure in a closed system occurs indicating rapid reaction of the carbon dioxide. The system is repressured over a period of ½ hour to full tank pressure until no further pressure drop is noted. The mixture is then allowed to shake for a period of approximately 12 hours, during which time the initial rise in temperature to about 60° C. may be increased by external heating to about 100° C. Additional heating is not entirely necessary in order to obtain complete reaction but does hasten the reaction time so that with heating, as little as 2 hours is sufficient. Shorter times may be employed if better mixing is available, such as propeller or turbo mixers. At the completion of the run the excess carbon dioxide is bled off, the bomb contents dumped into a Buchner funnel, and the salt washed with light naphtha or ethyl ether in order to remove excess solvent and small amounts of polymer. There is obtained a yield of from 128 to 134 g. of product varying in color from white to a light cream color. The material has a low density and very fine particle size, exhibiting fluid flow characteristics in a dry state.

*Run #3.—Dicyclopentadiene dicarboxylic acid.*—The sodium salt prepared in run #2 is conveniently converted to the free acid by dissolving the salt in water, boiling for a few minutes and precipitating the acid by addition of dilute HCl and recovering the acid crystals by filtration. The crude product is recrystallized from approximately 50% aqueous methanol or approximately 70% aqueous acetic acid. A perfectly white crystalline acid is obtained having a melting point of 210° C. and a neutralization equivalent equal to 509 mgm. KOH/gm. It may be represented by the following structural formula:

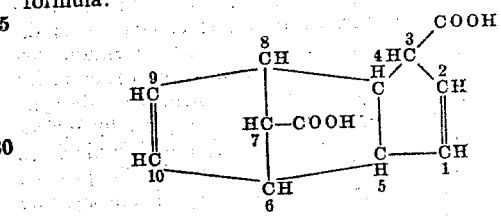

The above reactions described in runs 1, 2, and 3 are believed to be adequately described by the following series of equations:

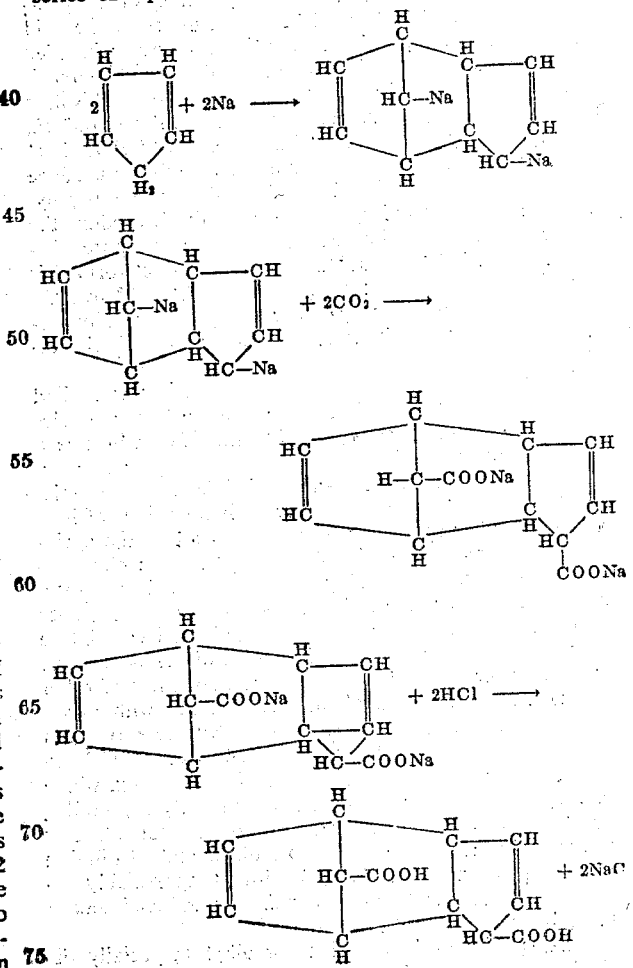

*Run #4.—Disodium dimethyl dicyclopentadiene dicarboxylic acid.*—Seventy-five grams of methylcyclopentadiene (boiling point 73° C.) was reacted at a temperature of 30° C. with 23 grams of sodium dispersed in 500 ml. of xylene. The sodium salt was then transferred to a silver-lined bomb having a capacity of 1.8 liters and charged with $CO_2$ at a gage pressure of 940#/sq. inch. An immediate rise in temperature and a drop in pressure occurred indicating extensive reaction. The bomb was repressured and allowed to shake for 3 hours without additional heating being applied.

On opening the bomb, filtering the solid and washing with ether, a white solid salt was obtained weighing 135.8 grams. Decomposition of the salt with acid and recrystallization from 70% acetic acid yielded a white acid, melting at 222–223° C. having a neutralization equivalent of 452 mgm. KOH/gm. Analysis by combustion gave the following:

|  | Found | Theor. $C_{14}H_{16}O_4$ |
| --- | --- | --- |
| Percent carbon | 67.12 | 67.72 |
| Percent hydrogen | 6.63 | 6.50 |

The following equations represent the chemical reactions involved in this preparation.

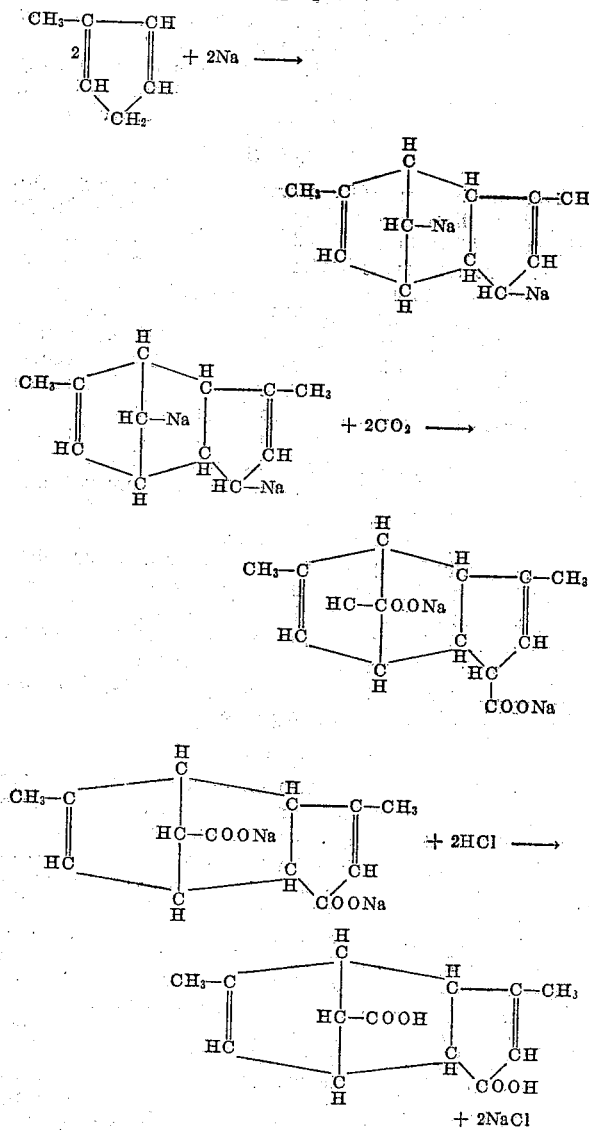

*Note.*—Position of methyl radical ($CH_3$) shown in above equations is not known with certainty, and is for illustration only.

Although the above examples describe the preparation of dicarboxylic acids from relatively pure cyclopentadiene and methyl cyclopentadiene, good yields of high quality acids are also obtained by reacting mixtures of these two components, for example, suitable mixtures may contain 90–10% of cyclopentadiene and 90–10% of methyl cyclopentadiene. In addition, vapor phase steam-cracked hydrocarbons boiling in the range of cyclopentadiene and methyl cyclopentadiene containing paraffins and aromatics as diluents may also be employed. The products comprise a mixture of the two acids, namely dicyclopentadiene dicarboxylic acid and dimethyldicyclopentadiene dicarboxylic acid.

PARTIALLY HYDROGENATED DICYCLODIENE CARBOXYLIC ACIDS IN POLYESTER RESINS

It is known that the dimethyl ester of dicyclopentadiene dicarboxylic acid can depolymerize to the monomeric methyl ester of cyclopentadiene carboxylic acid when heated to cracking temperatures of about above 200° C. It has also been discovered that progressive hydrogenation of the acids of the invention to the dihydro dicarboxylic acids and alkyl derivatives thereof imparts improved stability to the resulting acids and esters thereof and also renders said acids more suitable for use in the production of certain polyester resins of the invention where the reactive compounds and resins are subjected to high temperatures.

A representative process involves making a cyclodienyl sodium compound as above-described, by reacting at pressures of about 50 to 1000 p. s. i. g. monomeric cyclopentadiene with very finely divided metallic sodium at temperatures of about 10° to 40° C. in the presence of a small amount of an anhydrous alcohol as an activator. The dienyl sodium compound is then carboxylated with carbon dioxide at temperatures between about 30° to 100° C. (i. e. 60° C.) to produce the corresponding sodium salt of the acid. Finally the desired carboxylic acid can be obtained from the sodium salt by addition of hydrochloric acid or the like.

The resulting dicyclopentadiene dicarboxylic acid is usually a mixture of endo and exo isomers if the carboxylation temperature is in the range of about −30° C. to 0° C. However, if the carboxylation is at about 50° to 100° C., the product is substantially all endo isomer.

Hydrogenation of the aforementioned dicyclopentadiene dicarboxylic acid or of its alkyl substituted homologues gives dicarboxylic acids which are more stable and in some respects superior to the original unhydrogenated acids. For instance, unlike the unhydrogenated acids, the corresponding dihydrogenated compounds form more stable diesters of alcohols of 1 to 13 carbon atoms, e. g. methyl, ethyl, isooctyl, tridecyl, etc., which may be distilled without cracking, decarboxylation or polymerization.

However, it is apparent that it is less expensive to omit the hydrogenation step for those formulations where the improved thermal stability of the hydrogenated acids is not required.

The basic raw material from which essentially all of the compounds of this invention can be derived whether hydrogenated or unhydrogenated includes dicarboxylated dimers of cyclopentadiene, alkyl-substituted cyclopentadiene and mixtures thereof. Of foremost practical importance at present are dicyclopentadiene dicarboxylic acid, dimethyldicyclopentadiene dicarboxylic acid (which is a derivative of methylcyclopentadiene) and methyl-dicyclopentadiene dicarboxylic acid, which is a derivative of a mixture of cyclopentadiene and methylcyclopentadiene. Also, by hydrogenating the above dicyclodiene acids in such a manner that one of the double bonds originally present are saturated with hydrogen, the dihydro dicyclopentadiene dicarboxylic acids are formed as more fully described hereinafter. This hydrogenation can be illustrated by the following equation:

I.
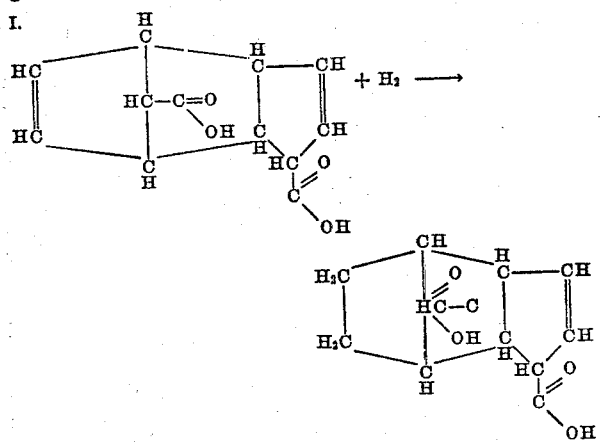

Either the dihydrogenated or the tetrahydrogenated acid may be made, depending on the amount of hydrogen allowed to react. When the hydrogenation is carried out, it proceeds in two distinct stages, and formation of the tetrahydrogenated acid normally does not begin until after the original acid was completely converted to the dihydroacid. Since the hydrogenation of the first double bond is substantially easier than the hydrogenation of the second double bond, the transition point between the two stages of the hydrogenation can be determined by following the hydrogen pressure drop. Since it is desired to prepare the dihydro acid, either the proper amount of one mole of hydrogen per mole of acid can be charged to begin with, or an excess of hydrogen may be charged and the hydrogenation may be arrested as soon as a significant change in the rate of hydrogenation is observed.

The reaction proceeds similarly when the corresponding derivatives of methylcyclopentadiene and related more highly alkylated cyclopentadienes are used.

The hydrogenation can be carried out at hydrogen pressures of about atmospheric to 2000 p. s. i. g., preferably at 15 to 150 p. s. i. g., and with the aid of various catalysts such as Adams platinum oxide ($PtO_2$), Raney nickel, etc. Also, since the dicyclodiene dicarboxylic acids are relatively high melting solids, it is advantageous to add a suitable solvent to the reaction mixture in a quantity sufficient to dissolve the original dicarboxylic acid. Suitable solvents include alcohols such as methanol, ethanol, and isopropanol as well as other inert oxygenated solvents such as acetic acid, dioxane, ether, tetrahydrofuran, etc. The amount of solvent added may equal about 5 to 50 times the weight of the dicarboxylic acid. The hydrogenation is carried out at temperatures between about 20 to 100° C., preferably 30 to 80° C.

The following run examplifies one method of preparing a dihydro dicyclopentadiene dicarboxylic acid:

Run #5.—Twenty-two grams (0.1 mol) of dicyclopentadiene dicarboxylic acid was dissolved in 315 grams (i. e. 400 mols) of anhydrous ethanol in a pressure bottle having a capacity of 1300 ml. and connected to a hydrogen storage tank having a capacity of 6810 ml. The free space in the system was 7625 ml. The dicarboxylic acid used was a white crystalline solid having a melting point of 210° C. and a neutralization equivalent of 509 mgm. KOH/gm. One hundred milligrams of Adams $PtO_2$ catalyst was added to the alcoholic solution of the acid, the air exhausted from the bottle and the system was then filled with hydrogen to a pressure of 41 p. s. i. g. On shaking, there was an immediate absorption of hydrogen until the pressure dropped at a reduced rate indicating completion of the formation of the dihydroacid. At the end of this reaction the reaction mixture was filtered to separate the catalyst from the alcoholic solution and the alcohol was evaporated from the solution on a steam bath under an atmosphere of nitrogen. The solid residue was dissolved in 100 ml. of 50% ethanol and recrystallized. The resulting 9,10-dihydrodicyclopentadiene dicarboxylic acid product was recovered in an essentially quantitative yield in the form of snow white crystals. When tested with bromine, it showed an unsaturation corresponding to one double bond per mole of the dicarboxylic acid product. The dihydroacid remained stable when heated under a blanket of nitrogen at a temperature of 250° C. for periods of 30 minutes and more, whereas the original unhydrogenated dicyclopentadiene dicarboxylic acid tended to decarboxylate and depolymerize at temperatures as low as 200° C. This increased stability is of great importance when the acid is to be used in various high temperature reactions such as the preparation of heat resistant polyesters.

*Example I*

Sixty one grams of ethylene glycol and 163.6 grams of the dicyclopentadiene dicarboxylic acid of run #3 were placed in a round bottom flask. The mixture was heated on an oil bath at 335° F. and stripped with natural gas. Heating was continued and the temperature raised to 365° F. over a period of 2.5 hours. The mixture was cooled to about 200° F. and then heated for an additional 2.25 hours under 2–8 mm. vacuum absolute at 335–350° F. A small flow of natural gas was employed to facilitate removal of moisture. Upon cooling under natural gas, a light amber resinous adduct was obtained which softened but did not liquefy at 175° F. Thirty seven grams of the adduct were then mixed with 6 grams of diphenyl methane diisocyanate. The mixture was heated with mixing at 284–302° F. for about 30 minutes. Upon cooling, a hard, brittle, modified polyester resin was recovered.

*Example II*

One hundred and fifty grams of the dihydro-dicyclopentadiene dicarboxylic acid of run #5 are mixed with 50 grams of 2,3 butanediol and placed in a round bottom flask. The mixture is heated on an oil bath at 350° F. and stripped with nitrogen gas. Heating is continued and the temperature raised to 375° F. over a period of 2 hours. The mixture is cooled to about 200° F. and then heated for an additional 3 hours under 4–6 mm. vacuum absolute at 345° F. ±5°. A small flow of nitrogen gas is employed to facilitate removal of moisture. Upon cooling under nitrogen, a resinous adduct is obtained. Twenty grams of the adduct is then mixed with 5.0 grams of p-phenylene diisothiocyanate. The mixture is heated at 300° F. for 30 minutes. Upon cooling, a hard, brittle, modified polyester resin is recovered.

The modified polyester resins of the present invention may be employed in varnishes wherein about 25–90 weight percent of a resin solvent are employed. Suitable solvents include straight run mineral spirits, naphthas, light fractions of cracked gas oils, kerosenes, gasolenes, heptane, hexane, isooctane, benzene, toluene, cyclohexane etc. This is illustrated by Example III.

*Example III*

Air dried films are drawn on mild steel panels from an equal mixture of the resin of Examples I and II with straight run mineral spirits. The mixture also contains 0.5 weight percent cobalt naphthenate. The thickness of the dried film is 1.20 mils. The properties of the air dried films containing the modified polyester resin of the invention are then compared to a conventional phthalic anhydride-glycerine resin control, during drying for drying characteristics, and after drying for hardness, water resistance, alkali resistance and grease resistance. In each instance, the surface coatings made from the modified polyester resins of the present invention derived from dicyclopentadiene dicarboxylic acid compounds were equal or superior to the surface coating prepared from the conventional phthalic anhydride-glycerine resin control; otherwise of the same formulation.

While there are above described a number of specific embodiments of the present invention, it is also obviously possible to produce other embodiments and various equivalent modifications and variations thereof without departing from the spirit of the invention or the scope of the appended claims.

What is claimed is:

1. A process for preparing polyester resins useful in varnishes which comprises heating 0.75 to 1.2 moles of a dicarboxylic acid selected from the group consisting of dicyclopentadiene dicarboxylic acid, dimethyldicyclopentadiene dicarboxylic acid, methyldicyclopentadiene dicarboxylic acid, and the di- and tetrahydrogenated derivatives thereof, with one mole of a $C_2$–$C_{10}$ glycol at a temperature between about 325° to 400° F., contacting the resinous polyester product thus formed with 5 to 30 weight percent, based on the total modified resin, of a cross linking agent selected from the group consisting of organic diisocyanates, organic diisothiocyanates, and mixtures thereof, at a temperature between about 265° to 325° F., and recovering a hard, modified polyester resin product.

2. A process according to claim 1 wherein the acid is dicyclopentadiene dicarboxylic acid.

3. A process according to claim 1 wherein the acid is dimethyldicyclopentadiene dicarboxylic acid.

4. A process according to claim 1 wherein the acid is dihydrodicyclopentadiene dicarboxylic acid.

5. A process according to claim 1 wherein the glycol is ethylene glycol.

6. A process according to claim 1 wherein the glycol is 2,3-butanediol.

7. A process according to claim 1 wherein the crosslinking agent is diphenyl methane diisocyanate.

8. A process according to claim 1 wherein the crosslinking agent is p-phenylene diisothiocyanate.

9. A varnish which comprises a modified polyester resin prepared by condensing 0.75 to 1.2 moles of a dicarboxylic acid selected from the group consisting of dicyclopentadiene dicarboxylic acid, dimethyldicyclopentadiene dicarboxylic acid, methyldicyclopentadiene dicarboxylic acid, and the di- and tetra-hydrogenated derivatives thereof, with one mole of a $C_2$–$C_{10}$ glycol at 325° to 400° F. and crosslinking the resinous polyester product thus formed with 5 to 30 weight percent, based on the total modified resin, of a crosslinking agent selected from the group consisting of organic diisocyanates, organic diisothiocyanates, and mixtures thereof at 265° to 325° F., said modified polyester resin being dissolved in 25 to 90 weight percent of a hydrocarbon resin solvent to form a varnish capable of being dried into hard, water-resistant surface coating films.

10. A varnish according to claim 9 wherein the resin solvent consists of straight run mineral spirits.

11. A varnish according to claim 9 containing a drying agent consisting of cobalt naphthenate.

12. A varnish according to claim 9 wherein the acid is dicyclopentadiene dicarboxylic acid, the glycol is ethylene glycol, and the crosslinking agent is diphenyl methane diisocyanate.

References Cited in the file of this patent

UNITED STATES PATENTS

| | | |
|---|---|---|
| Re. 24,123 | Cohen et al. | Feb. 28, 1956 |
| 2,333,639 | Christ et al. | Nov. 9, 1943 |
| 2,764,565 | Hoppe et al. | Sept. 25, 1956 |